J. B. Root,

Sectional Boiler.

No. 4,083. Reissued July 26. 1870.

Witnesses
Thos. Haines
R. Rahm

John B. Root

N. PETERS, PHOTO-LITHOGRAPHER, WASHINGTON, D. C.

United States Patent Office.

JOHN B. ROOT, FOR HIMSELF, AND THOMAS C. M. PATON, ASSIGNEE OF JOHN B. ROOT, OF NEW YORK, N. Y.

*Letters Patent No.* 74,146, *dated February* 4, 1868; *reissue No.* 4,083, *dated July* 26, 1870.

DIVISION B.

IMPROVEMENT IN STEAM-GENERATORS.

The Schedule referred to in these Letters Patent and making part of the same.

*To all whom it may concern:*

Be it known that I, JOHN B. ROOT, of the city, county, and State of New York, have invented certain new and useful Improvements in Steam-Boilers; and I do hereby declare that that the following is a full, clear, and exact description of the same, reference being had to the accompanying drawing.

This invention relates to what are known as water-tube steam-boilers, that is to say, steam-boilers, the water-spaces of which consist of horizontal or inclined tubes.

The accompanying drawing represents a boiler constructed according to my invention.

Figure 1:
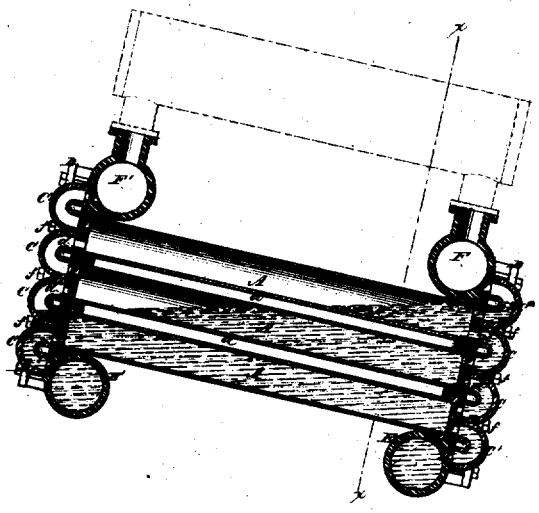
Figure 3:
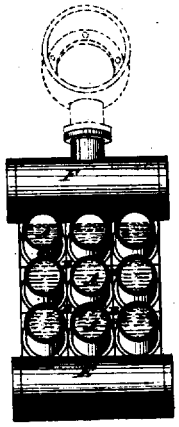
Figure 2:
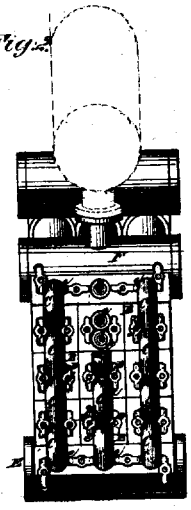

Figure 1 represents a longitudinal vertical section of a boiler;

Figure 2, an end view thereof, with a portion of one of the connections removed; and Figure 3, a transverse section of the same through the line *x x*, shown in fig. 1.

Similar letters of reference indicate corresponding parts in the several figures.

The boiler consists in a number of separate tubes containing the water to be heated, and which are arranged in tiers one above the other over the fire-place or furnace, the fire playing outside of the tubes, such tubes being connected at each end, each with the one immediately above and one immediately below it, and by which means a circulation is kept up, foaming prevented, and the steam kept drier.

The ends of the boiler are constructed of a series of plates or separate heads of square or parallelogrammic or other form, a separate plate or head being fitted to each end of each main tube, and serving, by means of apertures therein, and by return-pipes or bends, or their equivalents, to connect the main or water-tubes with each other and form tortuous communications.

Such water-tubes are also placed in an inclined position to the horizon, such that the water-line of the boiler may cross such tubes, so that they form not only the water-space of the boiler, but that portions of the internal spaces of such tubes, or of some of them, will also constitute steam-chambers.

The return-pipes or bends are attached to the heads of the several water-tubes by free socket-joints provided with packing and outside clamps carried and secured by stud-bolts, whereby every provision is made for expansion of the parts and the return-pipes allowed to tip or twist without straining the main tubes.

With the main water-tubes there may be also cross water-pipes connected therewith by means of return-pipes or bends, as aforesaid, and arranged to communicate with said tubes, or certain of them, at their ends, without breaking the continuity of the tubes.

A A represent tubes of wrought iron or other suitable metal, of any proper length, diameter, or thickness of metal, and of any desired number, arranged to lie one above the other, and of which there may be several series lying side by side, with flue or air-spaces between them or around each of such tubes.

Such tubes are placed in an inclined position to the horizon, as shown in fig. 1, sloping upwardly from the rear toward and over the fire-place, by which arrangement the water-line of the boiler may cross the several tubes, and a portion of the internal space of such tubes or of the upper series or tiers of tubes, is above the water-line, and thus constitute a steam-chamber.

Each and every one of such tubes A A is secured or fitted at its opposite ends into independent plates or blocks, B B, of square or parallelogrammic or other form, which form the heads of such tubes, and which, when combined and in their places, constitute the ends or general head of the boiler, and through which the connections and communications of the tubes A A with each other in each vertical series are established, by means of the return pipes, bends, or chambers hereafter described.

If preferred, the tubes A A may be of cast metal, with the plates or heads B B cast thereon.

To make or effect the connection and communication between the tubes A A, each plate or head B B is provided or constructed with apertures, *b b*, the one lying above the other, and around each of such apertures is made an annular socket, *c*, within which may be inserted an India-rubber ring, *d*, or other packing, and into these sockets the ends of the return-pipes or bends C C are fitted, said return-pipes or bends connecting the upper aperture *b* at each end of the one tube A, with the lower aperture *b* at the same end of the next tube A above, and being secured or held in their places by clamping-bars, D D, lapping over or on lugs or projections *e e*, and fastened by nuts and stud-bolts, *f*, connected with the plates or heads B B, such clamping-bars being preferably so constructed and arranged as that any one bar serves to bear on or hold two of the return-pipes on bends C C.

In fig. 2 one of the return-pipes or bends is omitted and another represented as broken, to expose the apertures *b b* and sockets *c c* to view.

Cross-pipes E E′ F F′ are or may be arranged above and below the tubes A A at opposite ends, which cross-pipes should be connected with the upper and lower rows of the tubes A A by or through bends or pipes, $C^1$ $C^2$, connecting the nearest of the apertures *b* of said tubes with apertures *g* in a similar-socketed manner to that used in establishing the connection of the return-pipes or bends C C, and being similarly held or secured by clamping-bars and stud-bolts connected with the cross-pipes, such clamping-bars being arranged to lie at right angles to those previously described, so that all the clamps or clamping-bars may be alike, as also all the plates or blocks or heads B B and return-pipes or bends C C and $C^1$ $C^2$, and likewise main pipes or tubes A A.

By such similarity or duplication of parts there is secured not only economy of construction but increased facility is provided for fitting, changing, and renewing of parts and extending or diminishing by increasing or lessening the number of tubes, the capacity of the boiler at pleasure. By this construction, also, it will readily be perceived that any of the tubes A A may be removed without disturbing the others.

The return-pipes or bends will be strong enough when of cast-iron, to prevent them bursting in advance of or sooner than the tubes A A, while the tubes A A, not being connected either with each other or the cross-pipes, excepting through the end plates or heads B B, are not cut away or weakened.

If desired, the lower arms or legs of the return-pipes or bends may be made longer than the upper ones, so as to admit, in an inclined position of the boiler, as represented, of the ends of the tubes A A, and their plates or heads B B lying in a vertical plane.

It may be further noticed as a desirable or important feature that by the socketed and clamped attachment of the return-pipes or bends C C, provision is made for the unequal expansion and tipping or twisting of such pipes or bends without straining on the tubes A A.

A boiler constructed as described may not only be got up cheap, light, compact, and durable, and be economical to work, but such a boiler is secure against serious or general explosion of its parts.

I do not claim in this division the peculiar features of construction here represented and described, which have been made the subject of division A of this reissue.

What I claim as my invention, is—

1. The return-tubes C, having free or socket joints connected or held to their places by independent outside clamps and stud-bolts and nuts, or their equivalents, substantially as and for the purpose herein set forth.

2. The cross-pipes E E′ F F′, or either of them, connected with the tubes A A at their ends by means of independent pipes or bends $C^1$ $C^2$, fastened by clamps and bolts, essentially as shown, for the purpose set forth.

JOHN B. ROOT.

Witnesses:
HENRY T. BROWN,
FRED. HAYNES.